United States Patent [19]
Goell et al.

[11] B 3,982,123
[45] Sept. 21, 1976

[54] OPTICAL FIBER POWER TAPS

[75] Inventors: James Emanuel Goell, Roanoke SW., Va.; Tingye Li, Rumson; Willis Martin Muska, Little Silver, both of N.J.

[73] Assignee: Bell Telephone Laboratories, Incorporated, Murray Hill, N.J.

[22] Filed: Nov. 11, 1974

[21] Appl. No.: 522,577

[44] Published under the second Trial Voluntary Protest Program on January 27, 1976 as document No. B 522,577.

[52] U.S. Cl. .............................. 250/227; 250/216; 350/96 C
[51] Int. Cl.² ........................................... G02B 5/14
[58] Field of Search ......... 250/227; 350/96 R, 96 C, 350/96 B, 96 WG

[56] References Cited
UNITED STATES PATENTS

| | | | |
|---|---|---|---|
| 3,045,223 | 7/1962 | Kapany et al. | 250/227 X |
| 3,058,021 | 10/1962 | Dunn | 250/227 X |
| 3,350,654 | 10/1967 | Snitzer | 250/227 X |
| 3,412,255 | 11/1968 | Krieger | 250/227 |
| 3,508,589 | 4/1970 | Derick et al. | 350/96 B X |
| 3,777,149 | 12/1973 | Marcatili | 250/227 X |

Primary Examiner—Walter Stolwein
Attorney, Agent, or Firm—Thomas C. O'Konski; Wilford L. Wisner

[57] ABSTRACT

There is disclosed a variety of arrangements for tapping a portion of the signal power from an optical fiber waveguide without requiring that the fiber be terminated or broken. Power is coupled out of the fiber waveguide, which typically includes an inner core surrounded by a lower refractive index outer cladding, by disposing a dielectric body in a coupling relationship with an intermediate length of the fiber from which all or most of the cladding has been removed or, alternatively, which is bent to cause a portion of the power to radiate out of the inner core into the outer cladding of the fiber. The dielectric body couples power out of the fiber provided its index of refraction is approximately equal to, or greater than, that of the fiber cladding material. The power coupled out by the dielectric body is converted to a representative electrical signal by a photodetector disposed adjacent to the dielectric body.

6 Claims, 13 Drawing Figures

OPTICAL FIBER POWER TAPS

CROSS-REFERENCE TO RELATED APPLICATION

This case dominates and relates to the concurrently filed, copending patent application of W. M. Muska, Ser. No. 522,518, in that the embodiment disclosed in FIGS. 3A, 3B, 4A, 4B, and the embodiment disclosed in FIGS. 6 and 7 of the present application are also disclosed and specifically claimed in that concurrently filed application.

BACKGROUND OF THE INVENTION

This invention relates to optical fiber communication systems and, more particularly, to arrangements for tapping signal power from an optical fiber waveguide without requiring that the fiber be terminated or broken.

Rapid progress has been made in the past few years in the design and fabrication of optical fiber waveguiding structures. There are now available several different fiber structures which are capable of transmitting large quantities of information via modulated optical waves or pulses with transmission losses as low as two decibels per kilometer. It is expected that some day such fibers will replace, at least in part, the wire pairs, coaxial cables and metallic waveguides now used in conventional communication systems. The advantages of fiber systems over conventional systems include the small physical size and light weight of the fiber waveguides, the broad bandwidth capabilities which afford flexibility in the selection of a bandwidth to be utilized in any given system, the nonconductive, noninductive properties of the fiber waveguides, and the potentially low cost of fiber materials and fabrication. The prospects of future use of the fiber systems are indeed wide-ranging, and continue to expand.

The earliest implementation of fiber systems is likely to involve multi-terminal information transfer over short distance optical fiber links using light-emitting diodes, which have now been developed to the point of having sufficiently long operating lives, as the signal source. Because of the light weight and the immunity to electromagnetic interference of fiber systems, fiber optical data bus links have been proposed for the transmission of control and intercom signals on board aircraft and ships. Other potential applications include interoffice trunks, such as those interconnecting telephone central offices within a city, "on-premise" distribution links within a building or between adjacent buildings, and data bus links in computer or industrial control systems.

In the longer range future, optical fiber systems are likely to be used for the high capacity transmission of digital information over long distance fiber links, with lasers as the signal source. Intercity telecommunication links may thus some day be provided using optical fibers. It appears likely that repeater spacings of several kilometers or more and information transmission rates in the gigabit range will become technically feasible with such systems.

Whatever the application, it is clear that arrangements will be required for extracting signal wave information from the optical fiber waveguides. To monitor and control the transmission through a fiber link, for example, it may be required to sample the signal propagating through the individual fiber waveguides periodically along the link. Optical data bus links will require that signals be extracted for utilization at numerous selected points along the link. In most instances, it would be desirable if a portion of the signal propagating through the fiber could be tapped therefrom without breaking or terminating the fiber. Fiber terminations can add unwanted optical losses to the system, and would unfavorably increase the need for highly precise fiber splicing and interconnecting arrangements.

SUMMARY OF THE INVENTION

In accordance with the present invention, there is provided a variety of arrangements for tapping signal power from an optical fiber waveguide without requiring that the fiber be terminated or broken.

In general, the optical fiber power taps of the invention are structured so that they can be attached at any intermediate position along an optical fiber waveguide for the purpose of extracting and detecting a portion of the optical signal propagating therethrough. Each illustrative embodiment of the tap is a structurally integral unit, easy to install and handle, which includes two basic elements: means for coupling power out of an intermediate length of a fiber waveguide, the coupling means comprising a body of dielectric material disposed in a coupling relationship with the fiber; and a photodetector designed and positioned with respect to the coupling means to receive and detect the power coupled out of the fiber by the coupling means.

With the typical fiber waveguiding structure, which includes a low optical loss inner core surrounded by a lower refractive index outer cladding, the desired coupling relationship is achieved by removing all or most of the cladding along a limited length of the fiber, and by disposing the dielectric body of the coupling means in contact with, or at least within about three optical wavelengths of, the inner core. Alternatively, the fiber waveguide is bent into a radius sufficient to cause a portion of the signal power guided therein to radiate out of the inner core into the outer cladding. The dielectric body of the coupling means is then disposed in contact with the outer cladding in the vicinity of the band. In either case, by selecting the index of refraction of the dielectric body to be approximately equal to or greater than that of the fiber cladding material, power is coupled out of the fiber. The photodetector is disposed adjacent to the coupling means to convert the power coupled out of the fiber directly to a representative electrical signal suitable for utilization.

BRIEF DESCRIPTION OF THE DRAWING

The various features and advantages of the invention will be better understood from the following detailed description taken in conjunction with the accompanying drawing in which.

The figures of the drawing are not necessarily drawn to scale or to relative dimensions.

DETAILED DESCRIPTION

Figure 1:
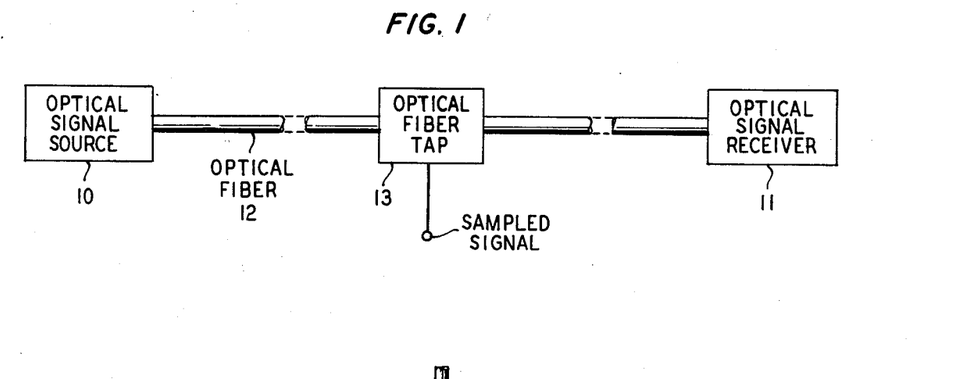
FIG. 1 is a block diagrammatic illustration of an optical fiber communication system including an optical fiber tap embodied in accordance with the invention.

FIG. 1 of the drawing shows, in block diagrammatic form, a typical optical communication system comprising an optical signal source 10, such as a laser or light-emitting diode, an optical receiver 11 and an optical fiber transmission link 12 illustratively comprising a single optical fiber waveguide coupling the source to the receiver. Fiber 12 may have a length anywhere from a few meters to several kilometers, depending upon the particular application of the system. The present invention relates to the optical fiber power tap shown as element 13 in FIG. 1. Each illustrative embodiment of fiber tap 13 described in detail hereinbelow is structured so that it can be attached, as shown, at any intermediate position along fiber 12 of the illustrated system for the purpose of sampling or monitoring the signal propagating therethrough. Each embodiment is structured so that a portion of the propagating signal can be tapped from the fiber without requiring that the fiber be terminated or broken.

Although only one fiber waveguide and one fiber tap are shown in FIG. 1, it should be noted that the transmission link could include a plurality of fiber waveguides. Optical fiber taps, like fiber tap 13, could then be attached to each fiber in the link, or to selected ones, as desired.

Figure 2A:
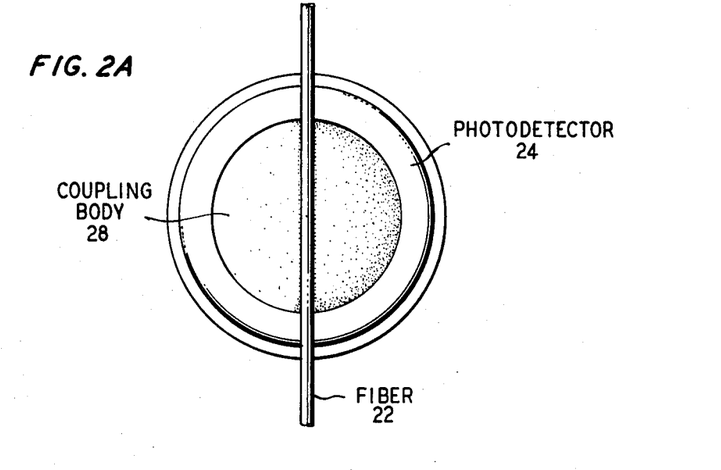
FIGS. 2A and 2B are top and side views, respectively, of a first illustrative embodiment of the fiber tap of the invention.
Figure 2B:
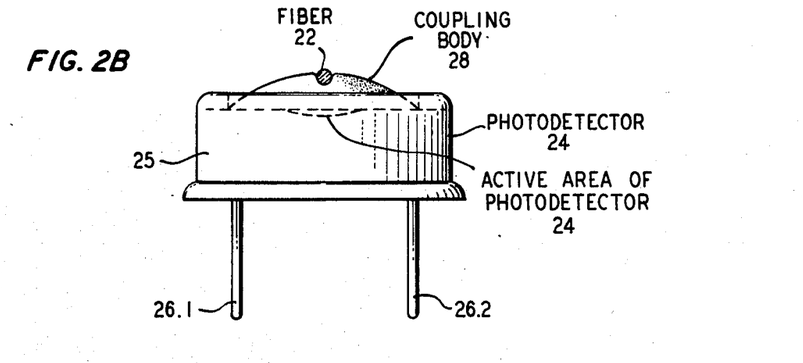

FIGS. 2A and 2B illustrate a first, relatively simple embodiment of fiber tap 13. Like each of the alternative embodiments described herein, the fiber tap of FIGS. 2A and 2B is a structurally integral unit including two basic elements: means for coupling power out of an intermediate portion of a fiber waveguide, the coupling means comprising a body of dielectric material disposed in a coupling relationship with the fiber; and a photodetector designed and positioned with respect to the coupling means to receive and detect the power coupled out of the fiber by the coupling means.

In the specific embodiment of FIGS. 2A and 2B, fiber 22 is illustratively an intermediate length of a fiber waveguide of the type that might be used in the optical communication system of FIG. 1. As is well known, the typical fiber waveguide includes a low optical loss core surrounded by a cladding of lower refractive index than that of the core. The index of refraction of the inner core may be uniform, or radially graded with the maximum index along the central axis of the core. In each case, the optical power is generally confined within the inner core of the fiber, with little power in the outer cladding. To provide the desired tap in this embodiment, all or most of the outer cladding is accordingly removed from the limited length of fiber 22 shown in FIG. 2A. For those fibers in which the cladding is formed of a plastic material, removal thereof can be accomplished simply by stripping the cladding from the core with a suitably sharp implement, such as a razor blade, or by chemically stripping the cladding from the core with a suitable solvent which dissolves the cladding material. For those fibers in which the cladding is formed of a glass material, fused silica or other inorganic material, removal thereof would typically be accomplished by precisely grinding the cladding to expose the core, or at least to have a thickness less than about three optical wavelengths. A fiber grinding technique and arrangement suitable for this purpose is disclosed in U.S. Pat. No. 3,777,149, issued to E. A. J. Marcatili on Dec. 4, 1973, where it is used in the fabrication of signal detection and delay equalization apparatus for an optical fiber.

The coupling means in the embodiment of FIGS. 2A and 2B is dielectric body 28, which is formed of an optically transparent cement, such as an epoxy or other optically transparent, hardenable material. The body is disposed over the active area of photodetector 24 in an unhardened state so that the stripped portion of fiber 22 can be disposed in contact therewith, as shown, and is then allowed to harden to fix fiber 22 in place. A large area of contact between fiber 22 and body 28 is preferable. Care is taken during the positioning of fiber 22 to assure that it is disposed accurately over the active area of photodetector 24.

As long as the material of body 28 is selected to have a refractive index which is approximately equal to, or greater than, the refractive index of the material of the outer cladding of fiber 22, power will be coupled out of the fiber by body 28. In general, the amount of power coupled out of the fiber by body 28 increases as the index of refraction of the body is increased, and as the coupling length between fiber 22 and body 28 is increased. To provide a relatively low power tap, for example, one which extracts of the order of one per cent of the total power from fiber 22, the index of refraction of body 28 would typically be selected to be within about ± 20 per cent of the index of refraction of the fiber cladding material. Relatively high power taps, which extract larger fractions of the total power from fiber 22 (e.g., 50 per cent of the power), preferably employ a coupling body 28 of refractive index which exceeds that of the fiber cladding material, and may even exceed that of the fiber core material. Thus, the particular index of refraction selected for coupling body 28 in the embodiment depends upon the type of tap desired, but is in all cases in the range of about 0.8 times the fiber cladding index and greater. The typical coupling length between fiber 22 and body 28 is of the order of one millimeter.

Photodetector 24 may be any one of a variety of conventional photodetectors designed to respond to the wavelength of the optical wave propagating through fiber 22, which is illustratively about one micrometer. The article by H. Melchoir et al in Volume 58 of the *Proceedings of the IEEE*, pages 1466–1486 (October 1970) describes a number of alternative high sensitivity photodetectors suitable for optical communication systems use. Illustratively, photodetector 24 is a solid state photodiode of the p-i-n form, such as the SGD 100A, 100 mil diameter, silicon p-i-n photodiode manufactured and offered commercially by E. G. & G., Inc. As shown in FIG. 2B, the photodetector illustratively includes a metal outer casing 25, an external lead 26.1 which is electrically grounded, and an output lead 26.2 from which an electrical signal corresponding to the detected optical signal is taken. Preferably, the glass window protecting the active area of the photodiode is removed so that coupling body 28 can be disposed in direct contact therewith.

For a relatively low power tap, it may be preferable to use an avalanche photodiode for photodetector 24. Avalanche photodiodes combine the detection of optical signals with an internal amplification of the photodiode, and thus are generally more sensitive than the various non-avalanching photodiode structures.

Since coupling body 28 is preferably disposed in direct contact with the active area of photodetector 24, the material of the body should be such that it does not chemically attack or otherwise damage the quality of the detector. An epoxy, such as Araldite which is offered commercially by Ciba Products Corp., has been found suitable for body 28 for this purpose. This epoxy has an index of refraction of about 1.57. Thus if the cladding material of fiber 22 is fused silica ($n = 1.46$) or glass (typically $n \sim 1.5$), the desired relative indices are achieved between body 28 and fiber 22. Numerous other combinations of materials for coupling body 28 and fiber 22 will, of course, be recognized as suitable for use in this embodiment.

Although clad fiber waveguides are at present the most likely candidates for use in future optical communication systems, other fiber waveguiding structures are possible, such as unclad (i.e., air clad) fibers, and single material fibers of the type disclosed in Volume 52 of *The Bell System Technical Journal*, pages 265–268 (February 1973). Whatever the fiber structure, the coupling body of the fiber tap, to provide the desired coupling relationship, should be disposed in contact with, or at least within about three optical wavelengths of, the portion of the fiber in which the optical power is confined. Thus, to tap unclad fibers, dielectric body 28 is simply disposed in contact with the exterior surface of the fiber. To tap a single material fiber, coupling body 28 would illustratively be disposed in contact with the enlarged central region of the fiber through which the optical power is propagated. In the latter case, removal of the outer tubing protecting the enlarged central guiding region of the fiber may be required in the vicinity of the tap. In either case, power is coupled out of the fibers if the index of refraction of the coupling body equals, or exceeds the index of the medium surrounding the guiding portion of the fiber, which is typically air. Again, the amount of power coupled out of the fiber increases as the index of refraction of the coupling body is increased.

To make the tap of FIGS. 2A and 2B more convenient and practical to handle during installation or maintenance by the service personnel in the field, photodetector 24 may be attached to a suitable board (not shown) or other support. The photodetector could then be electrically coupled to output circuitry formed on the board, which may include conventional amplifying and signal processing apparatus. Additionally, a plurality of fiber taps of the type illustrated in FIGS. 2A and 2B could be assembled on a common board so that optical signals propagating through two or more fiber waveguides in a multiple fiber link are simultaneously monitored. It is noted that at no point in the disclosed tapping arrangement is it required to terminate or break the individual fiber waveguides in order to make the desired tap.

Figure 3A:
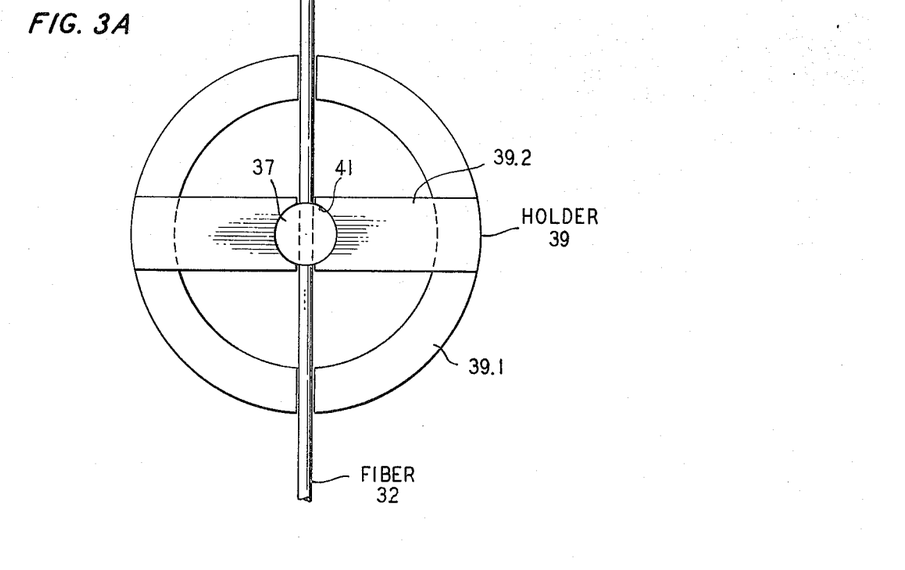
FIG. 3A is a top view and FIG. 3B is an exploded side view of a second illustrative embodiment of the fiber tap.
Figure 3B:
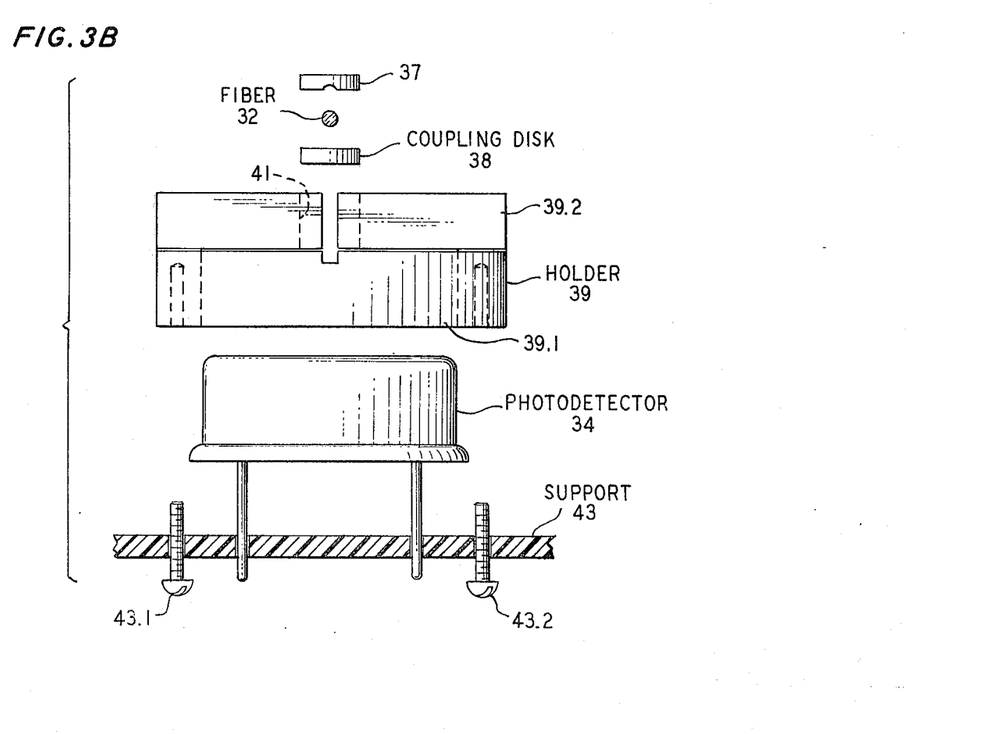

FIGS. 3A and 3B of the drawing illustrate a second embodiment of fiber tap 13. Like fiber 22 of FIGS. 2A and 2B, fiber 32 illustratively has all or most of its outer cladding removed along a limited length thereof to be disposed in contact with the coupling means of the tap. Photodetector 34 is again illustratively a solid-state photodetector such as the SGD 100A silicon p-i-n photodiode. As is shown more clearly in the exploded side view of FIG. 3B, fiber 32 is disposed between dielectric disks 37 and 38. Disk 38, which serves as the coupling means in the tap, is formed of a dielectric material having a refractive index which is approximately equal to, or greater than, the refractive index of the cladding material of fiber 32.

The material of coupling disk 38 is also preferably substantially more compliant than the material of either fiber 32 or disk 37. Many plastic materials have refractive indices comparable to, or in excess of, the materials commonly employed in the fabrication of fiber waveguides (e.g. glasses, fused silica, etc.), and are also relatively compliant. Plastic materials are thus preferred for coupling disk 38.

By forcing disks 37 and 38 together, fiber 32 is made to deform the upper surface of disk 38, and to provide a relatively large area of contact therewith. Disk 37, which was indicated to be a relatively hard material, is also preferably formed of a dielectric material. It, however, has a refractive index which is equal to or less than that of the cladding material of fiber 32, and is in all cases less than the refractive index of coupling disk 38, so that the majority of the power coupled out of the fiber is coupled out by coupling disk 38. A groove is preferably provided along the lower surface of disk 37 to restrict lateral movement of fiber 32 when the two disks are forced together.

To maintain proper alignment, the assembly of fiber 32, disks 37 and 38 and photodetector 34 are disposed in a specially designed holder 39. Holder 39 is preferably formed of a durable material such as a metal (e.g., brass). It includes two pieces, an annularly shaped base 39.1 and a rectangular cross bar 39.2 which is fixed (e.g., hard soldered) diametrically across and on top of base 39.1. The inner diameter of base 39.1 is selected so that photodetector 34 can be inserted, and preferably fixed, therein. Base 39.1 and bar 39.2 are cut (e.g., sawed) perpendicular to the long dimension of the bar, as shown in the figures, to provide a centrally disposed slot therein suitable for holding fiber 32 in place. The slot is illustratively cut completely through bar 39.2, but only partially through base 39.1 of holder 39. A hole 41 is drilled through the central portion of bar 39.2 of a diameter sufficient to accommodate disks 37 and 38. Illustratively, the inner diameter of hole 41 is such that it provides a tight fit for disk 37, and in that way prevents movement of disk 37 out of the hole after it is forced therein. Alternatively, disk 37 can be glued or otherwise fixed in holder 39. Holder 39 is illustratively fixed to a suitably perforated support 43 by screws 43.1 and 43.2.

Figure 4A:
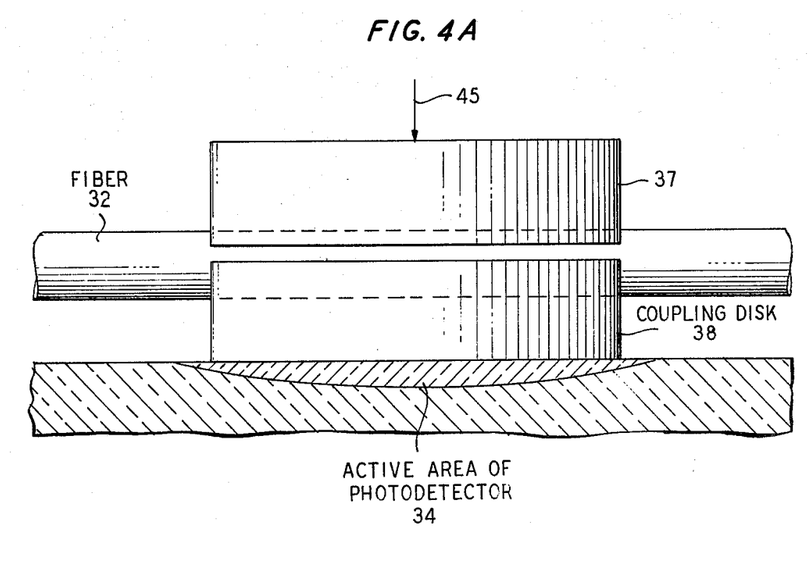
FIGS. 4A and 4B are orthogonal side views which show in greater detail the positioning of the respective elements in the embodiment of FIGS. 3A and 3B.
Figure 4B:
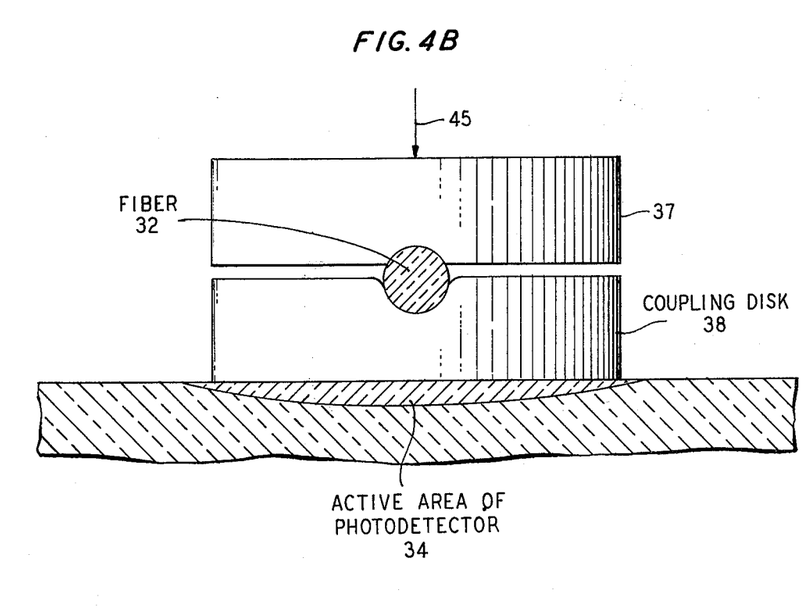

FIGS. 4A and 4B are magnified views illustrating the relative positioning of disks 37 and 38, fiber 32 and photodetectors 34 when inserted in holder 39. To provide a clearer picture of the respective elements, holder 39 is not shown in these figures. It is noted that coupling disk 38 is disposed directly over the active area of photodetector 34 (photodetector 34 is shown in partial cross-section). The groove provided in the lower surface of disk 37 assures that fiber 32 is also accurately disposed over the active area of photodetector 34. The downward pressure on disk 37, illustrated by arrow 45, causes fiber 32 to deform the relatively compliant coupling disk 38, and forces coupling disk 38 against photodetector 34. Good optical contact is thus assured between fiber 32 and coupling disk 38, as well as between coupling disk 38 and photodetector 34. This good optical contact and accurate alignment of the respective elements is maintained during handling and use of the fiber tap by holder 39.

As an example, if the cladding of fiber 32 is formed of a material such as fused silica ($n = 1.46$), a suitable material for coupling disk 38 is polyvinylchloride (PVC). PVC has a refractive index of about 1.54, and can be made to be substantially more compliant than fused silica (i.e., Young's modulus for highly plasticized PVC can be as low as 1,000 to 2,000 pounds per square inch (psi), while Young's modulus for fused silica is about $10^7$ psi). Disk 37 could be formed of a teflon copolymer of tetrafluoroethylene and hexafluoropropylene (FEP), which has a refractive index of about 1.33 and a modulus of about $5 \times 10^4$ psi. The groove in the lower surface of disk 37 could then be provided by embossing the disk at an elevated temperature with a suitably sized fiber or wire.

Fiber 22 of the embodiment of FIGS. 2A and 2B and fiber 32 of the embodiment of FIGS. 3A through 4B were both illustratively indicated hereinabove to be clad fiber waveguides from which all or most of the outer cladding had been removed along the limited length of the fiber in contact with the coupling body of the tap. As noted hereinabove, stripping the cladding from a plastic clad fiber is typically a relatively simple task. However, stripping the cladding from a fiber in which the cladding is a glass, fused silica or some other similar inorganic material generally requires the use of a precision grinding technique, such as that employed in U.S. Pat. No. 3,777,149. Under certain circumstances, such precision techniques can be too time-consuming and, in general, impractical, especially when practiced in the field by service and maintenance personnel. The following embodiments of the fiber tap are preferred for tapping clad fiber waveguides in that they do not require that the cladding be stripped from the fiber before the tap can be made.

Figure 5A:
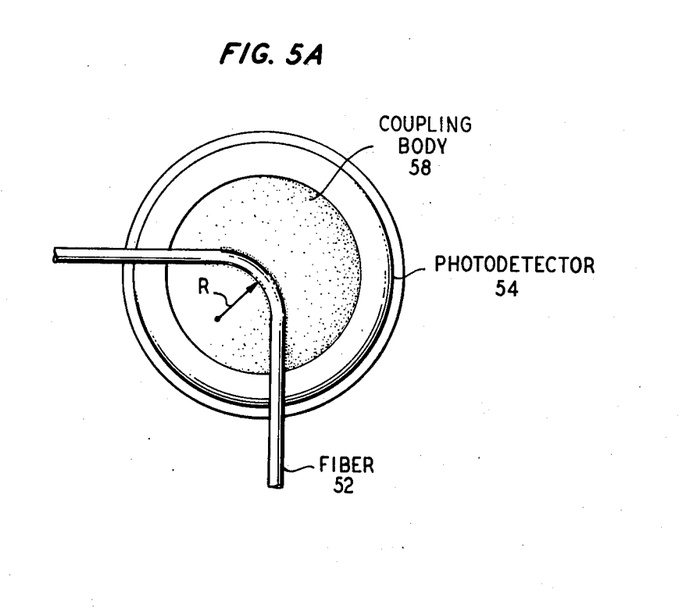
FIGS. 5A and 5B are top and side views, respectively, of a modified version of the embodiment of FIGS. 2A and 2B useful for tapping clad optical fiber waveguides without removing the cladding therefrom.
Figure 5B:
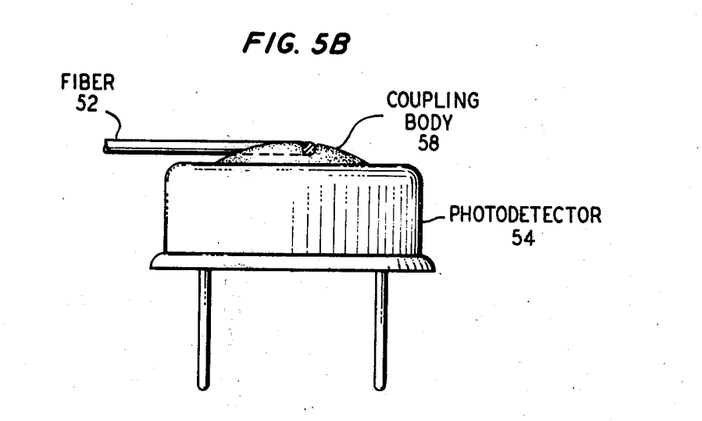

FIGS. 5A and 5B illustrate how the relatively simple embodiment of FIGS. 2A and 2B can be modified to facilitate the tapping of clad fiber waveguides. Photodetector 54 is illustratively identical to photodetector 24 of FIGS. 2A and 2B. Fiber 52 is again illustratively a clad fiber waveguide including an inner core surrounded by an outer cladding of lower refractive index than that of the core. Coupling body 58 is illustratively an optically transparent cement, such as an epoxy, having a refractive index which is approximately equal to, or greater than, the refractive index of the outer cladding of fiber 52. In order for coupling body 58 to be effective in coupling power out of fiber 52, the fiber is bent into a radius R over the active area of photodetector 54. The bend in fiber 52 causes a portion of the power propagating in the inner core to radiate into the outer cladding of the fiber from which it can then be extracted by coupling body 58. The radius R of the bend in fiber 52 is selected small enough in value that the desired portion of the power is radiated from the inner core to the outer cladding and eventually detected by photodetector 54. Advantageously, it is possible with this embodiment to change the radius R of the bend to adjust the amount of power that is coupled out of the fiber and eventually detected. In general, the smaller the radius R, the greater the amount of power that is tapped from fiber 52. Care should be taken to avoid breaking fiber 52 by selecting the bending radius R too small.

Figure 6:
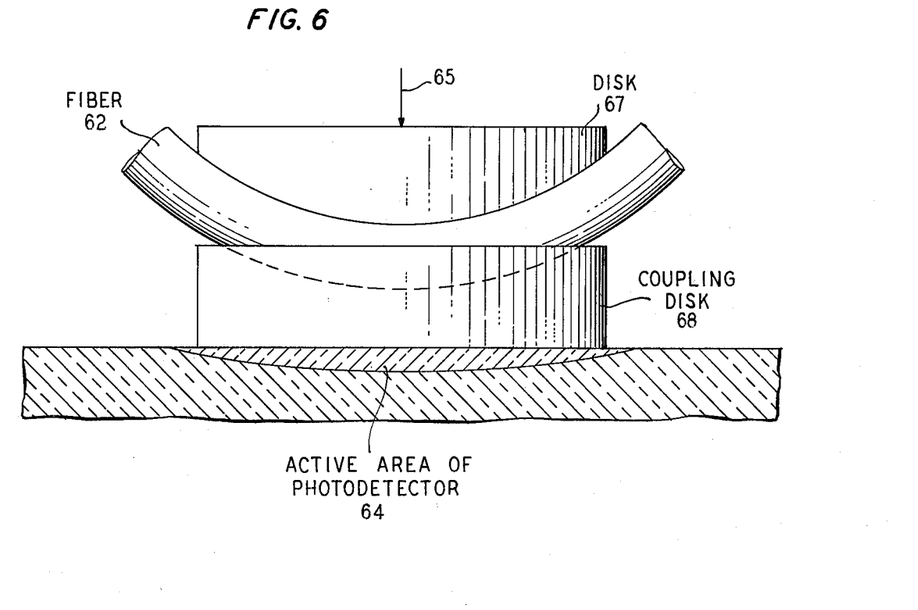
FIG. 6 is a side view of a modified version of the embodiment of FIGS. 4A and 4B useful for tapping clad optical fiber waveguides without removing the cladding therefrom.

FIG. 6 is a side view of a modified version of the embodiment of FIGS. 3A through 4B which can be used for tapping clad fiber waveguides without removing all or most of the cladding from the fiber in the vicinity of the tap. Again, holder 39 is not shown in FIG. 6 to provide a clearer picture of the respective tapping elements. Photodetector 64 (shown in partial cross-section) is illustratively identical to photodetector 24 of FIGS. 2A and 2B. Fiber 62, like fiber 52, is a clad fiber waveguide including an inner core and a lower refractive index outer cladding. Coupling disk 68 is formed of a relatively compliant dielectric material (e.g., polyvinylchloride) having a refractive index equal to, or greater than, the outer cladding of fiber 62. Disk 67 is formed of a relatively hard dielectric material (e.g., teflon, FEP) of a refractive index lower than that of coupling disk 68. In order for coupling disk 68 to be effective in extracting power from fiber 62, disk 67 is provided with a lower surface of a rounded cross-section. Thus, when disk 67 is forced against fiber 62 in the direction of arrow 65, fiber 62 is forced to bend conforming to the rounded surface of disk 67. As noted above, the resulting bend in fiber 62 causes a portion of the power propagating in the inner core of the fiber to radiate to the outer cladding from which it can be extracted by coupling disk 68, and eventually detected by photodetector 64. Adjustment of the tapped power can be achieved either by varying the pressure applied to disk 67 in the direction of arrow 65, or by replacing disk 67 with another similar disk having a rounded surface of a different radius of curvature.

Figure 7:
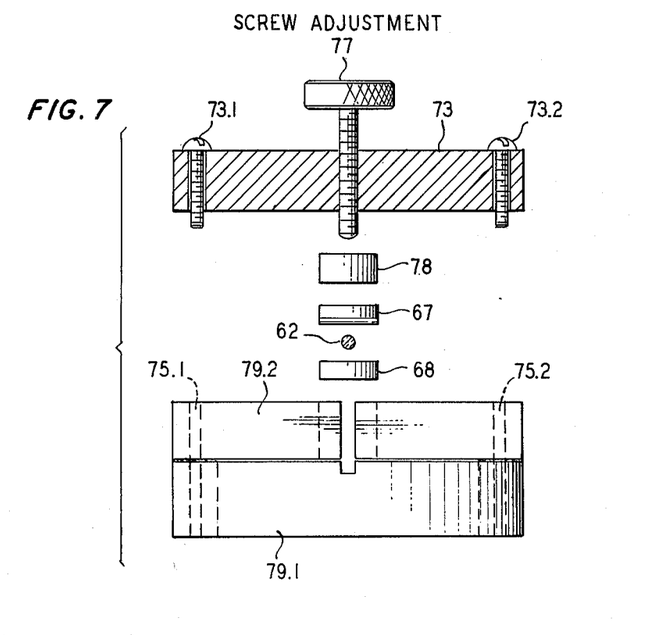
FIG. 7 is an exploded side view of a modified version of the embodiment of FIGS. 3A and 3B designed for adjusting the amount of power tapped from an optical fiber waveguide.

FIG. 7 is an exploded side view of an arrangement which can be used to adjust the pressure exerted on disk 67 of FIG. 6 to adjust the amount of power tapped from fiber 62. Holder 79 of FIG. 7 includes an annular base 79.1 and a cross bar 79.2, and is illustratively identical to holder 39 of FIG. 3B with the exception of the two threaded holes 75.1 and 75.2 provided at opposite ends of the upper surface of bar 79.2. A clamping bar 73 illustratively formed of a metal, such as brass, is disposed on top of bar 79.2 of holder 79 and fastened thereto by screws 73.1 and 73.2. Bar 73 includes a centrally disposed threaded hole in which screw adjustment 77 is inserted and can be turned. Spacer 78 is spaced between the end of screw adjustment 77 and disk 67 to avoid damage to the latter during tightening of the screw adjustment. By tightening screw adjustment 77, downward pressure is exerted on disk 67. As the downward pressure is increased (e.g., as screw adjustment 77 is further tightened), the power tapped from fiber 62 is increased, at least up to a point where fiber 62 conforms completely and continuously to the lower rounded surface of disk 67. After that point, there is generally little change in the tapped power with increased downward pressure. As noted above, however, further adjustment of the tapping can be achieved by replacing disk 67 with one of a different (e.g., smaller) radius of curvature.

It should be noted that the arrangement shown in FIG. 7 can also be used with the embodiment of FIGS.

3A through 4B to maintain the desired downward pressure on disk 37 shown in those figures. It has also been found that there is a limited range of adjustment available by tightening screw adjustment 77 even if a flat surfaced disk such as disk 37 is used. The increase in the tapped power under such circumstances is attributed to the increasing area of contact between fiber 32 and the relatively compliant coupling disk 38 resulting from the increasing downward pressure exerted on disk 37.

Figure 8A:
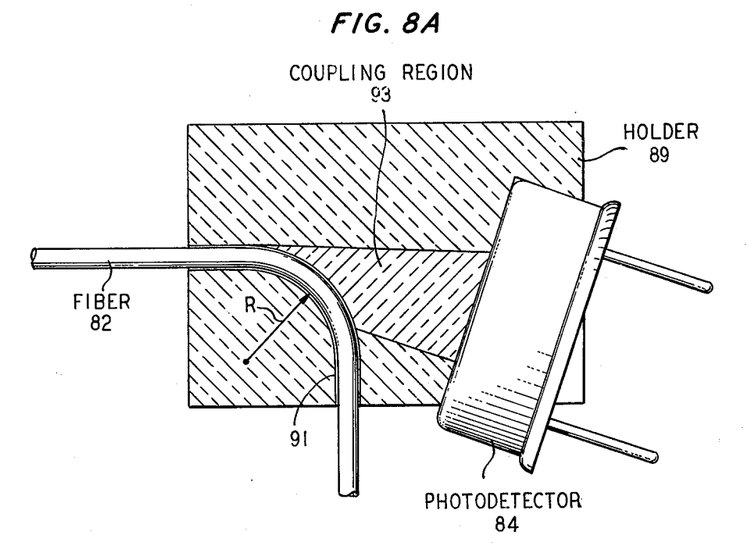
FIGS. 8A and 8B are top and side views, respectively, of a third illustrative embodiment of the fiber tap of the invention useful for tapping clad optical fiber waveguides without removing the cladding therefrom.
Figure 8B:
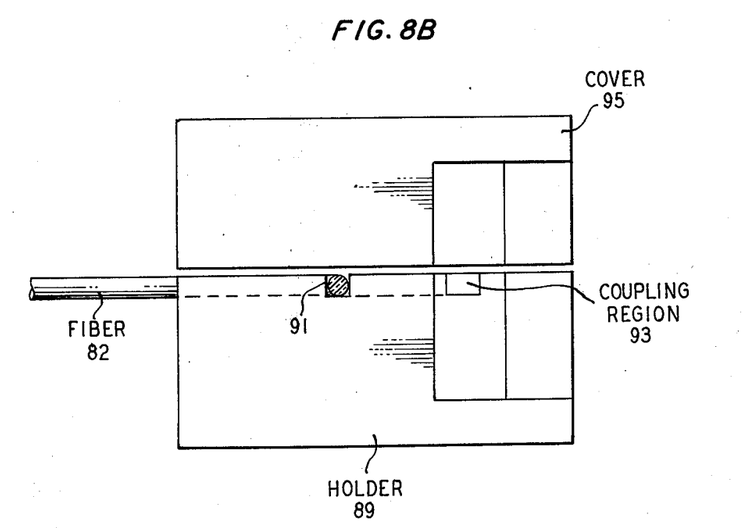

In FIGS. 8A and 8B, there is shown a third illustrative embodiment of fiber tap 13 useful for tapping clad fiber waveguides without requiring that the cladding be stripped therefrom. As in the other embodiments described hereinabove, photodetector 84, shown in the top view of FIG. 8A, but not shown for clarity in the side view of FIG. 8B, is illustratively a SGD 100A silicon p-i-n photodiode. Fiber 82 is illustratively a clad fiber waveguide. Holder 89 is a rectangular block of a dielectric material (e.g., teflon FEP) having a refractive index less than that of the outer cladding of fiber 82. The upper major surface of holder 89 includes a groove 91 having a curved path and dimensions comparable to, but slightly larger than, fiber 82, so that the fiber can be inserted in the groove, as shown in the figures. Also formed in the upper surface of holder 89 is a coupling region 93 which serves to couple power out of the fiber and which is formed of a dielectric material (e.g., polyvinylchloride) of refractive index approximately equal to or greater than the outer cladding of fiber 82. Coupling region 93 illustratively has a thickness equal to that of groove 91 and a width which gradually increases with distance away from groove 91. Photodetector 84 is spaced apart from groove 91 and oriented in holder 89 so that its active area is aligned over the end of coupling region 93 opposite to groove 91. Preferably, a region of holder 89 is cut away so that photodetector 84 can be fixed (e.g., glued) to the holder in the aligned position with respect to coupling region 93, as shown.

To make the desired tap with the embodiment of FIGS. 8A and 8B, fiber 82 is inserted in groove 91 of holder 89. The fiber is thus forced to bend into a radius R conforming to the curvature of the groove. The bend in the fiber causes power to radiate out of the inner core of the fiber to its outer cladding. Coupling region 93 can thus extract some of the power from fiber 82 and carry it to photodetector 84 where it is detected. To assure good optical contact between fiber 82 and coupling region 93, an index matching fluid having a refractive index matching that of coupling region 93 can be smeared into groove 91 before or after fiber 82 is inserted therein. Cover 95 shown in FIG. 8B can then be placed over holder 89 to hold fiber 82 in position.

As noted hereinabove, it is possible to vary the amount of power coupling out of the fiber by varying the radius R of the bend therein. It may thus be convenient with this embodiment to fabricate a group of several holders, such as holder 89 of FIGS. 8A and 8B, each of which has a groove, such as groove 91, of a different radius of curvature. The desired amount of tapped power can then be selected by selecting the proper holder from the group.

It is to be understood that the above-described embodiments are illustrative of but a few of the many possible specific embodiments which can represent applications of the principles of the invention, as defined by the appended claims.

What is claimed is:

1. An arrangement for tapping optical power from an intermediate portion of an optical fiber waveguide without requiring that the fiber be terminated or broken, said fiber including a guiding region in which the optical power is essentially confined, and including a medium surrounding said guiding region, said arrangement being characterized by:

a body of dielectric material disposed in a coupling relationship to an intermediate length of said fiber, said body having an index of refraction which is approximately equal to or greater than the index of refraction of the medium surrounding said guiding region of said fiber and is selected to couple only a minor portion of the optical power propagating in said fiber waveguide guiding region toward a surface of said dielectric body laterally offset from said guiding region;

a photodetector contacting said laterally offset surface of said dielectric body and including an active area responsive to the wavelength of the optical signal to be propagated through said fiber, said active area of said photodetector being oriented to intercept the optical power coupled out of said guiding region of said fiber by said dielectric body; and in which said guiding region of said fiber comprises an inner core formed of a low optical loss material, said medium surrounding the guiding region comprising an outer cladding of lower refractive index than that of said inner core; and said dielectric body has an index of refraction greater than about 0.8 times the index of refraction of said outer cladding of said fiber.

2. The tapping arrangement of claim 1 in which said outer cladding of said fiber is at least partially removed along said intermediate length of said fiber to have a thickness less than three wavelengths of the optical signal to be propagated through said fiber; and said intermediate length of said fiber is disposed in contact with said dielectric body.

3. The tapping arrangement of claim 2 in which said dielectric body is formed of an optically transparent cement and is disposed in contact with the active area of said photodetector; and said intermediate length of said fiber is disposed in contact with said cement while said cement is in an unhardened state to provide an area of contact between said intermediate length and said cement at a position to provide nondirectional coupling from said intermediate length of fiber to the active area of said photodetector, said cement being allowed to harden to fix said fiber in place.

4. The tapping arrangement of claim 1 in which said intermediate length of said fiber is bent into a radius R sufficient to cause a selected minor portion of the optical power to be propagated therein to radiate out of said inner core into said outer cladding; and said cladding of said intermediate length of said fiber is disposed in contact with said dielectric body.

5. The tapping arrangement of claim 1 further including a holder having a groove cut into a major surface thereof, the groove having a curved path of radius of curvature R and dimensions comparable to but slightly greater than the outer diameter of said fiber so that said fiber can be inserted into said groove, the radius of curvature of the path of said groove being sufficient to bend said fiber into a radius to cause a portion of the optical power to be propagated therein to radiate out of said inner core into said outer cladding, said holder being further adapted to hold said photodetector in a position spaced apart from said groove; and in which said dielectric body comprises a coupling region formed in said major surface of said holder and connecting the groove to the active area of said photodetector, said holder being formed of a dielectric material with an index of refraction less than that of said coupling region.

6. The tapping arrangement of claim 5 further including a cover disposed over said major surface of said holder to hold said fiber in the groove.

* * * * *